(12) United States Patent
    Ouderkirk et al.

(10) Patent No.: US 11,366,425 B2
(45) Date of Patent: Jun. 21, 2022

(54) FREEFORM POLARIZATION VOLUME HOLOGRAM

(71) Applicant: Facebook Technologies, LLC, Menlo Park, CA (US)

(72) Inventors: Andrew John Ouderkirk, Menlo Park, CA (US); Robin Sharma, Menlo Park, CA (US); Hannah Noble, Menlo Park, CA (US); Babak Amirsolaimani, Menlo Park, CA (US); Yusufu Njoni Bamaxam Sulai, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 426 days.

(21) Appl. No.: 16/417,278

(22) Filed: May 20, 2019

(65) Prior Publication Data

US 2020/0371475 A1    Nov. 26, 2020

(51) Int. Cl.
    *G03H 1/00* (2006.01)
    *G03H 1/04* (2006.01)
    *G03H 1/20* (2006.01)

(52) U.S. Cl.
    CPC ........... *G03H 1/0493* (2013.01); *G03H 1/202* (2013.01); *G03H 2001/0495* (2013.01); *G03H 2250/41* (2013.01)

(58) Field of Classification Search
    CPC .... G03H 1/0493; G03H 1/202; G03H 1/0248; G03H 1/0272; G03H 1/0256; G03H 1/0808; G03H 2001/0495; G03H 2250/41; G03H 2250/00; G03H 2270/55; G03H 2270/22; G03H 2270/20; G03H 2270/21; G03H 2240/15; G03H 2222/31; G03H 2223/23; G03H 2226/05; G02B 27/0172; G02B 27/283; G02B 27/0093; G02B 27/0174; G02B 27/017; G02B 27/286; G02B 27/4261; G02B 2027/0178; G02B 2027/0138; G02B 2027/0107; G02B 2027/0103; G02B 5/30; G02B 5/3016; G02B 5/3083; G02B 5/32; G02B 5/3025; G02B 2005/1804
    USPC .......................................................... 359/30
    See application file for complete search history.

(56) References Cited

U.S. PATENT DOCUMENTS

| | | | | |
|---|---|---|---|---|
| 2008/0278675 | A1* | 11/2008 | Escuti | G02B 27/283 349/201 |
| 2015/0331167 | A1* | 11/2015 | Escuti | G02B 5/32 359/3 |
| 2017/0373459 | A1* | 12/2017 | Weng | G02B 30/25 |
| 2018/0004156 | A1 | 1/2018 | Schilling et al. | |
| 2018/0239177 | A1* | 8/2018 | Oh | G02B 6/0055 |

FOREIGN PATENT DOCUMENTS

WO         2014/062615 A2     4/2014

OTHER PUBLICATIONS

International Search Report and Written Opinion dated Aug. 3, 2020, in PCT Application No. PCT/US2020/033371, filed on May 18, 2020 (10 pages).

* cited by examiner

*Primary Examiner* — Stephone B Allen
*Assistant Examiner* — Jyotsna V Dabbi
(74) *Attorney, Agent, or Firm* — Millburn IP PLLC (57) ABSTRACT

A polarization volume hologram (PVH) lens includes a PVH layer having a freeform design. The PVH layer includes a first region and a second region having different optical properties.

15 Claims, 11 Drawing Sheets

FREEFORM POLARIZATION VOLUME HOLOGRAM

TECHNICAL FIELD

The present disclosure relates to optical technologies and, more specifically, to a freeform polarization volume hologram (PVH) lens and an optical system having the same.

BACKGROUND

Freeform optical components, e.g., optical components having freeform surfaces such as freeform lens and freeform mirrors, have been widely used in various optical instruments. Freeform optical components offer several advantages over conventional, spherical optical components, such as increased range of manufacturable surfaces, enhanced optical performance, simplified system structure, and relatively easy system integration.

A conventional freeform optical component usually includes a specifically designed surface, often configured to have different radii of curvatures at different locations on the surface. As a result, light incident at a certain point on the surface can be reflected or refracted as desired. However, manufacturing a conventional freeform optical component requires the use of high-precision cutting and polishing instruments, which results in low productivity and high cost.

SUMMARY

In accordance with the disclosure, there is provided a polarization volume hologram (PVH) lens including a PVH layer having a freeform design. The PVH layer includes a first region and a second region having different optical properties.

Also in accordance with the disclosure, there is provided an optical system including a PVH lens and an optical sensor. The PVH lens includes a PVH layer having a freeform design. The PVH layer includes a first region and a second region having different optical properties. The optical sensor is configured to generate an image using light reflected by the PVH layer.

DETAILED DESCRIPTION

Hereinafter, embodiments consistent with the disclosure will be described with reference to drawings, which are merely examples for illustrative purposes and are not intended to limit the scope of the disclosure. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. The described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides an optical lens based on a polarization volume hologram (PVH) layer having a freeform design and an optical system using such a freeform PVH lens. Hereinafter, a PVH layer having a freeform design is also referred to as a "freeform PVH layer" and an optical lens based on a freeform PVH layer is also referred to as a "freeform PVH lens." Depending on applications, the PVH layer can be transmissive, reflective, or partial-transmissive-partial-reflective. The freeform PVH layer consistent with the disclosure can be responsive to light with a certain wavelength, such as infrared (IR) light for eye tracking purposes in a head-mounted display (HMD). The IR light can have a wavelength of, e.g., about 850 nm, about 940 nm, or about 980 nm. Further, the freeform PVH layer can be responsive to incident light with one or more particular polarization handednesses, such as incident light with a left-handed circular polarization and/or incident light with a right-handed circular polarization. In this disclosure, a PVH layer/region responding to or being responsive to incident light with a certain wavelength and/or a certain polarization handedness means the PVH layer/region can divert the incident light with that wavelength and/or polarization handedness. Further, the wavelength to which the PVH layer/region can respond to is also referred to as a "responded wavelength" and the polarization handedness to which the PVH layer/region can respond to is also referred to as a "responded polarization handedness."

Figure 1A:
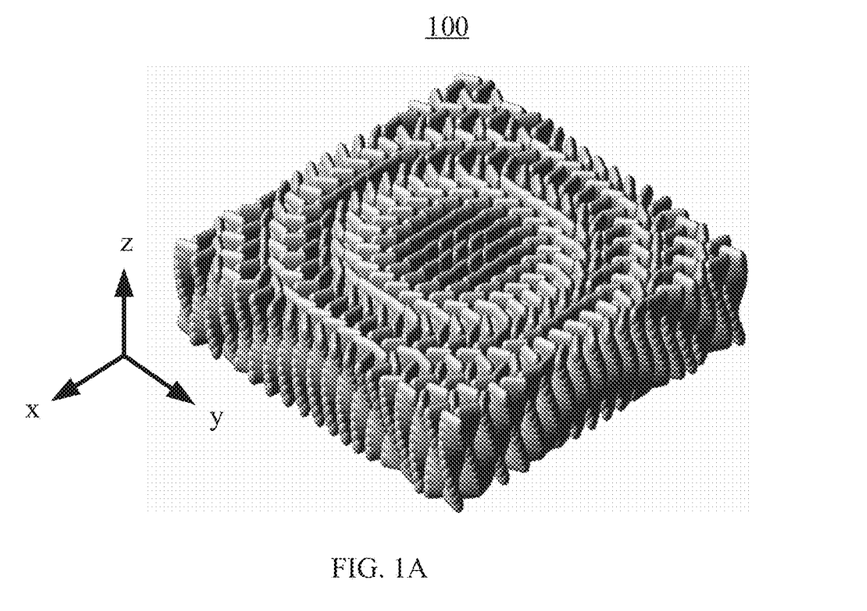
FIGS. 1A and 1B schematically show an example PVH layer consistent with the disclosure.
Figure 1B:
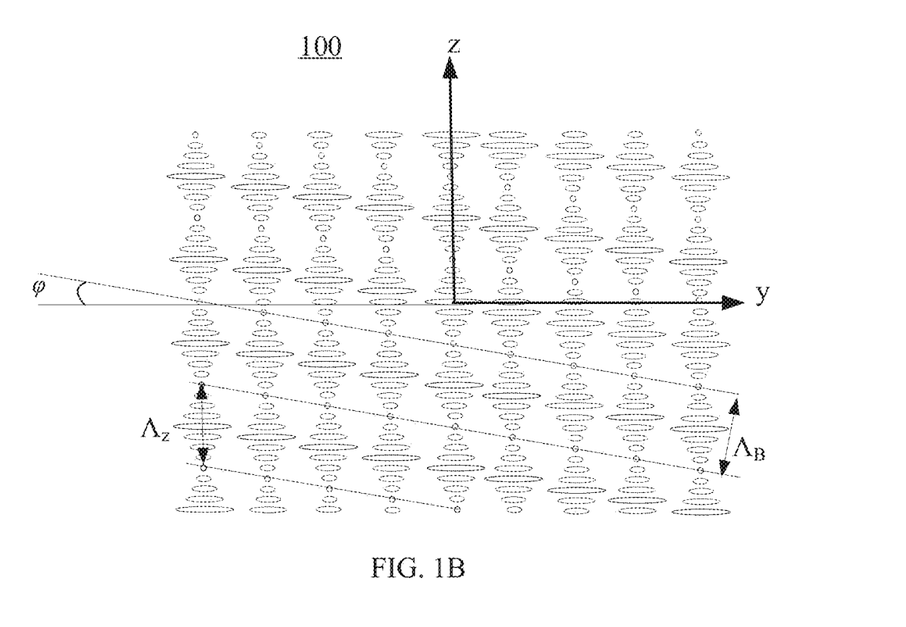

A PVH layer can include a birefringent material layer including a plurality of birefringent molecules, and is also referred to as, e.g., "polarization sensitive gratings," "polarization sensitive optical elements," "liquid crystal gratings," or "chiral liquid crystal elements." For example, the PVH layer can include a liquid crystal (LC) layer including a plurality of liquid crystal (LC) molecules. The LC molecules are spatially orientated to enable at least one optical function of the PVH layer. FIGS. 1A and 1B schematically show an example PVH layer 100 consistent with the disclosure. FIG. 1A is a perspective view of the PVH layer 100. FIG. 1B is a cross-sectional view of the PVH layer 100 in the y-z plane.

The optical function of a PVH layer can be determined based on the configuration or manipulation of optic axes of the LC molecules in the PVH layer. Hereinafter, an orientation of the optic axis of an LC molecule is also referred to as an orientation or alignment of the LC molecule. The manipulation of optic axes of the LC molecules in the PVH layer can be a 3-dimensional (3D) alignment of the LC molecules. A PVH layer consistent with the disclosure can deflect light via Bragg diffraction. The Bragg grating in the PVH layer can be created by doping a chiral dopant into a birefringent host to induce helical twist along the vertical direction, e.g., the z-axis direction shown in FIGS. 1A and 1B.

As shown in FIG. 1B, in the z-axis direction of the PVH layer 100, the LC molecules twist and the rotating angle changes continuously and periodically along the z-axis with a period of $\Lambda_z$. The period $\Lambda_z$ (or pitch length $p=2\Lambda_z$) is adjusted by controlling the helical twist power (HTP) and concentration of the chiral dopant. Similarly, an in-plane periodicity in the x-y plane is also introduced into the PVH layer 100 by, e.g., modifying the surface alignment of the PVH layer 100 to provide a rotation of the optic axes of the LC molecules in the x-y plane. As a result, the Bragg planes in the PVH layer 100 become slanted, as indicated by the slanted lines in FIG. 1B. The distance between neighboring slanted lines is the Bragg period $\Lambda_B$ of the Bragg grating formed by the LC molecules in the PVH layer 100. The Bragg period $\Lambda_B$ can depend on the z-axis period $\Lambda_z$ of the LC molecules and a slanting angle $\varphi$ of the Bragg planes with respect to a surface of the PVH layer 100, e.g., with respect to the y-axis direction in FIG. 1B.

When the LC layer is thick enough, Bragg diffraction can be established. The Bragg grating in the PVH layer 100 can diffract normally incident light when the following condition is satisfied:

$$2n_{eff}\Lambda_B \cos \varphi = \lambda$$

where $n_{eff}$ denotes the effective refractive index of the birefringent host material of the PVH layer 100, and $\lambda$ denotes the wavelength of the incident light. The wavelength $\lambda$ can be, e.g., from about 800 nm to about 1600 nm, such as about 850 nm, about 940 nm, or about 980 nm. The Bragg period of the Bragg grating in the PVH layer 100 can be, e.g., from about 130 nm to about 270 nm, or centered at about 140 nm or 156 nm. In some embodiments, the Bragg period can be longer, such as 0.9 μm, 1 μm, or 1.1 μm.

The slanted Bragg grating can allow the PVH layer 100 to redirect incident light to be converged or diverged in reflection or in transmission. Thus, through further manipulation of the orientation of the LC molecules in the x-y plane, the PVH layer 100 can be configured to function as a lens, such as a reflective lens or a transmissive lens, that can, e.g., converge or diverge an incident light beam. In some embodiments, the PVH layer 100 can reflect light without changing the convergence or divergence of the incident light. The PVH layer is also referred to as a "PVH lens."

Figure 2:
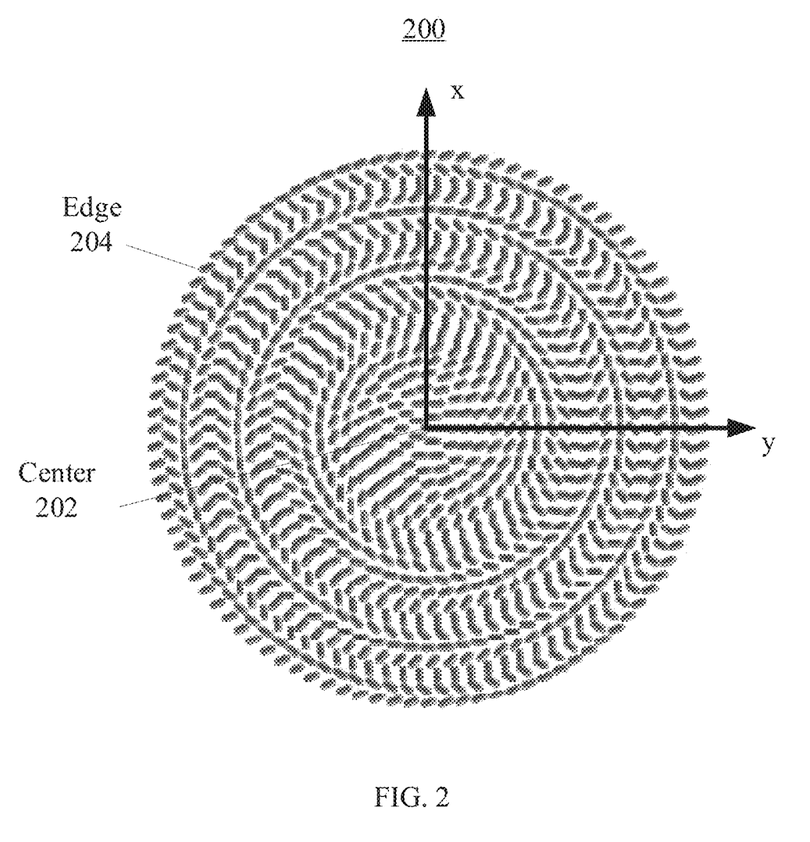
FIG. 2 is a schematic view showing an example lens created in a PVH layer consistent with the disclosure.

FIG. 2 is a schematic view showing a lens created in a PVH layer 200 consistent with the disclosure. The lens in the PVH layer 200 can be created via the in-plane (x-y plane) orientation (azimuth angle θ) of the LC molecules, in which the phase difference T=2θ. In the PVH layer 200, the azimuth angles of LC molecules change continuously from a center 202 to an edge 204 of the PVH layer 200, with a varied period Λ, i.e., a distance between two LC molecules whose azimuth angles differ from each other by 180°.

The lens of the PVH layer 200 may include a certain symmetry in the arrangement of the LC molecules about an optical axis of the PVH layer 200, which, for example, may pass through the center 202 of the PVH layer 200. As shown in FIG. 2, the LC molecules in at least a portion of the PVH layer 200 are orientated or aligned rotationally-symmetrically (e.g., three-fold, four-fold, six-fold, or eight-fold) about the optical axis of the PVH layer 200. In some embodiments, in the center portion of the PVH layer 200, the LC molecules are aligned rotationally-symmetrically about the optical axis of the PVH layer 200. In some embodiments, the rotational-symmetry of the LC molecules can be axisymmetry, i.e., the LC molecules in the at least one portion can be aligned axisymmetrically about the optical axis of the PVH layer 200.

Figure 3A:
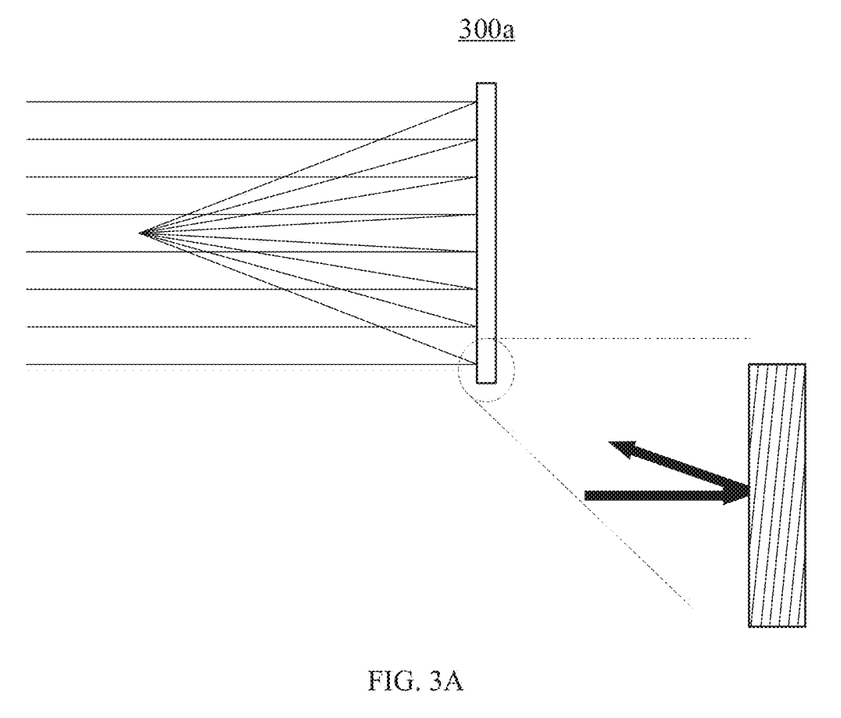
FIGS. 3A and 3B schematically show an example PVH layer configured as a reflective lens and an example PVH layer configured as a transmissive lens, respectively.
Figure 3B:
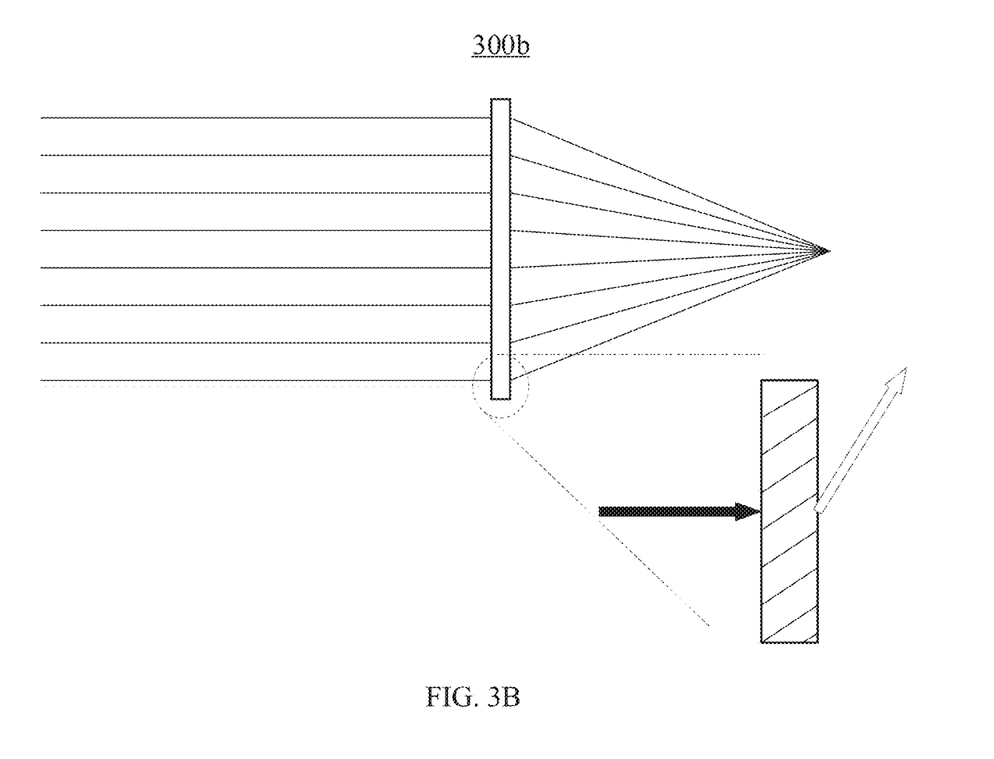

As described above, the diffraction of incident light by the Bragg grating in a PVH layer may depend on the slanting angle of the Bragg planes with respect to a surface of the PVH layer. Therefore, with respect to the PVH layer as a whole, the diffracted light may be reflected light or transmitted light, which may depend on the slanting angle. Accordingly, the PVH layer can be configured as a reflective lens or a transmissive lens. FIGS. 3A and 3B schematically show a PVH layer 300a configured as a reflective lens and a PVH layer 300b configured as a transmissive lens, respectively. The inset in each of FIGS. 3A and 3B is an enlarged view of a portion of the PVH layer 300a or the PVH layer 300b, schematically showing the reflecting or transmitting characteristics of the PVH layer as a result of different slanting angles. As shown in FIGS. 3A and 3B, the reflected light retains the same polarization handedness as the incident light, while the transmitted (but diverted) light has an opposite (orthogonal) polarization handedness as the incident light. In the examples shown in FIGS. 3A and 3B, the incident light has a left-handed circular polarization (indicated by solid arrow in the figures), and hence the reflected light also has a left-handed circular polarization while the transmitted light has a right-handed circular polarization (indicated by hollow arrow in the figures).

The optical properties of a PVH layer can be configured by configuring the helix twist in the z-axis direction and the properties of the Bragg planes in the PVH layer, including, for example, the slanting angle of the Bragg planes, the Bragg period, and the change of the slanting angle and/or the Bragg period in the x-y plane. The properties of the Bragg planes can be configured by configuring the orientation and/or the alignment of the LC molecules in the PVH layer. For example, both the slanting angle of the Bragg planes and the Bragg period depend on the periodicity of the LC molecules along the z-direction and the in-plane periodicity of the LC molecules in the x-y plane. The twist and the change of rotating angle of the LC molecules along the z-axis direction, and hence the periodicity of the LC molecules in the z-axis direction, can be configured by, e.g., introducing different types (e.g., different helical twist power) or different concentration of chiral dopant into the PVH layer. Further, the change of rotating angles in the x-y plane, and hence the in-plane periodicity, can be configured by modifying the surface alignment of the PVH layer. Changing the properties of the Bragg planes in the PVH layer can affect how the PVH layer act on incident light, such as how the PVH layer divert the incident light. The optical properties, e.g., the optical power and the optical axis direction, of the PVH layer may depend on how the incident light is diverted, i.e., the angle between the incident light and the deflected light. Hereinafter, the deflected light by the PVH layer is also referred to as "exiting light," which can be reflected light or transmitted light, depending on whether the exiting light is on a same side of the PVH layer as or a different side of the PVH layer than the incident light.

The characteristics of PVH layer allow the properties thereof to be configured locally by manipulating the LC molecules locally. In some embodiments, the surface alignment of the PVH layer and/or the change of the surface alignment can be modified locally. In some embodiments, the periodicity in the z-axis direction can also be modified locally. As a result, the properties of the Bragg grating in the PVH layer, such as the slanting angle of the Bragg planes, the Bragg period, and the change of the slanting angle and/or the Bragg period in the x-y plane, can be modified locally. Accordingly, the optical properties of the PVH layer, such as the optical power and the optical axis direction of the PVH layer, can be modified locally. For example, different regions of the PVH layer can have different optical powers and/or different optical axis directions. Such a PVH layer is also referred to as having a freeform design. Consistent with the disclosure, a PVH layer having a freeform design can include at least two regions having different optical properties and hence different lens properties.

Figure 4A:
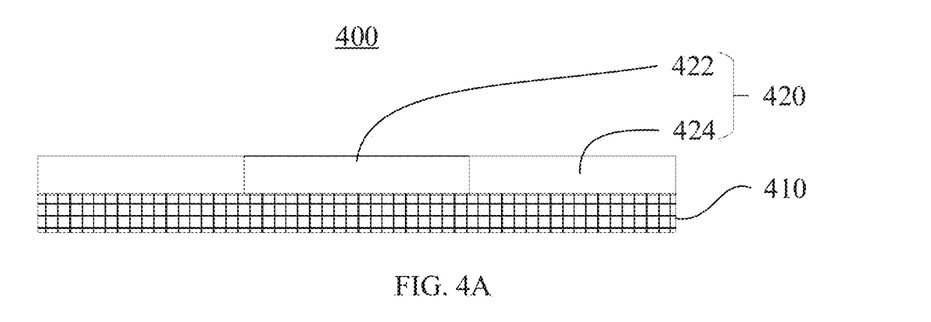
FIGS. 4A and 4B are schematic views of an example PVH lens consistent with the disclosure.
Figure 4B:
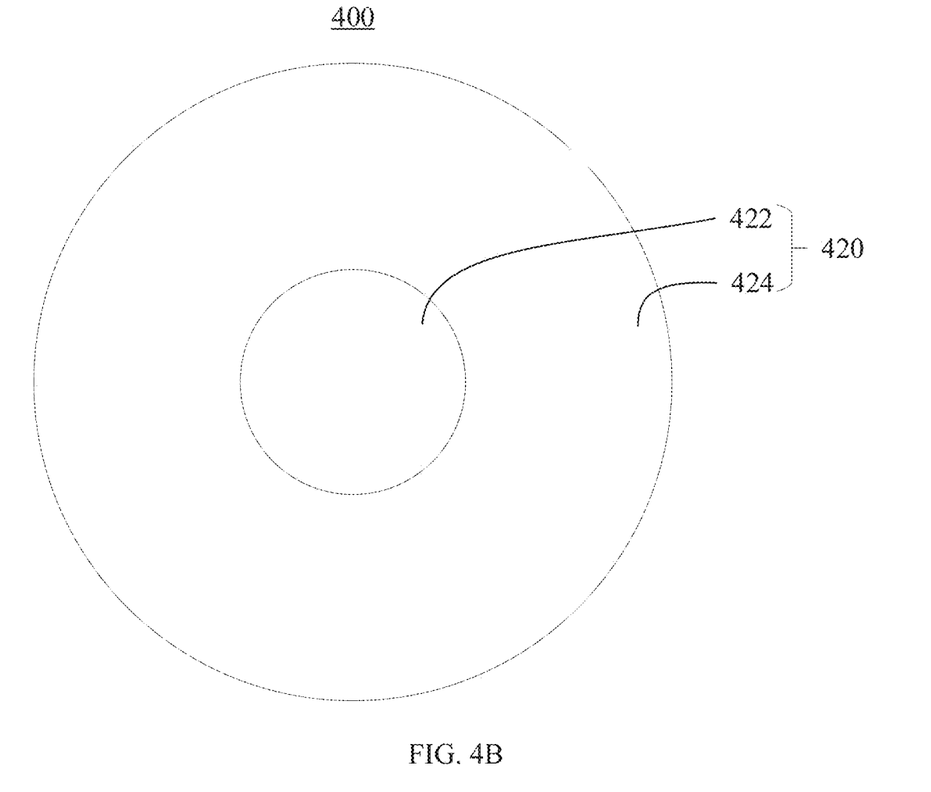

FIGS. 4A and 4B are schematic views of an example PVH lens 400 consistent with the disclosure. FIG. 4A is a cross-sectional view of the PVH lens 400 and FIG. 4B is a plan view of the PVH lens 400. As shown in FIG. 4A, the PVH lens 400 includes a substrate 410 and a PVH layer 420 arranged over the substrate 410. The substrate 410 provides support to the PVH layer 420, and can be, for example, a piece of rigid material, such as glass or sapphire, a piece of flexible material, such as plastic, or a functional device, such as a display screen. Depending on whether the PVH lens 400 is configured as a reflective lens or a transmissive lens, the substrate 410 can be either transparent or opaque. For example, if the PVH lens 400 is configured as a reflective lens for one or more wavelengths or one or more wavelength bands, the substrate 410 can be either transparent or opaque with respect to the one or more wavelengths or the one or more wavelength bands depending on the purpose of the PVH lens 400. On the other hand, if the PVH lens 400 is configured as a transmissive lens for one or more wavelengths or one or more wavelength bands, the substrate 410 can be transparent with respect to the one or more wavelengths or the one or more wavelength bands. For example, the substrate 410 can be substantially transparent in the visible band (about 380 nm to about 750 nm). As another example, the substrate 410 can be also transparent in part or all of the IR band (about 750 nm to about 1 mm).

For illustrative purposes, in FIG. 4A (and some other figures), the substrate 410 and the PVH layer 420 are shown as contacting each other. In actual implementation, they can contact each other or be spaced apart from each other by, for example one or more spacing members, or by being held at different places of a frame or a housing of the PVH lens 400 or an optical system having the PVH lens 400. In some embodiments, additional layer(s), such as protection layer(s) and/or buffer layer(s), may be arranged between the substrate 410 and the PVH layer 420. In some embodiments, a PVH lens consistent with the disclosure can include a PVH layer without a substrate and the PVH layer is capable of supporting itself.

Further, as shown in FIGS. 4A and 4B, the PVH layer 420 has a freeform design and includes a first region 422 and a second region 424.

In some embodiments, the first region 422 and the second region 424 of the PVH layer 420 can be configured to have different optical properties. The optical property of a PVH layer/region may refer to, e.g., the optical power of the PVH layer/region, the optical center of the PVH layer/region, the optical axis direction of the PVH layer/region, the wavelength to which the PVH layer/region responds, the polarization handedness to which the PVH layer/region responds, and/or reflective/transmissive of the PVH layer/region. FIGS. 5A-5D show different example configurations of the PVH layer 420 of the PVH lens 400 consistent with the disclosure. In the examples shown in FIGS. 5A-5D, the first region 422 and the second region 424 of the PVH layer 420 differ from each other in terms of different types of optical properties.

Figure 5A:
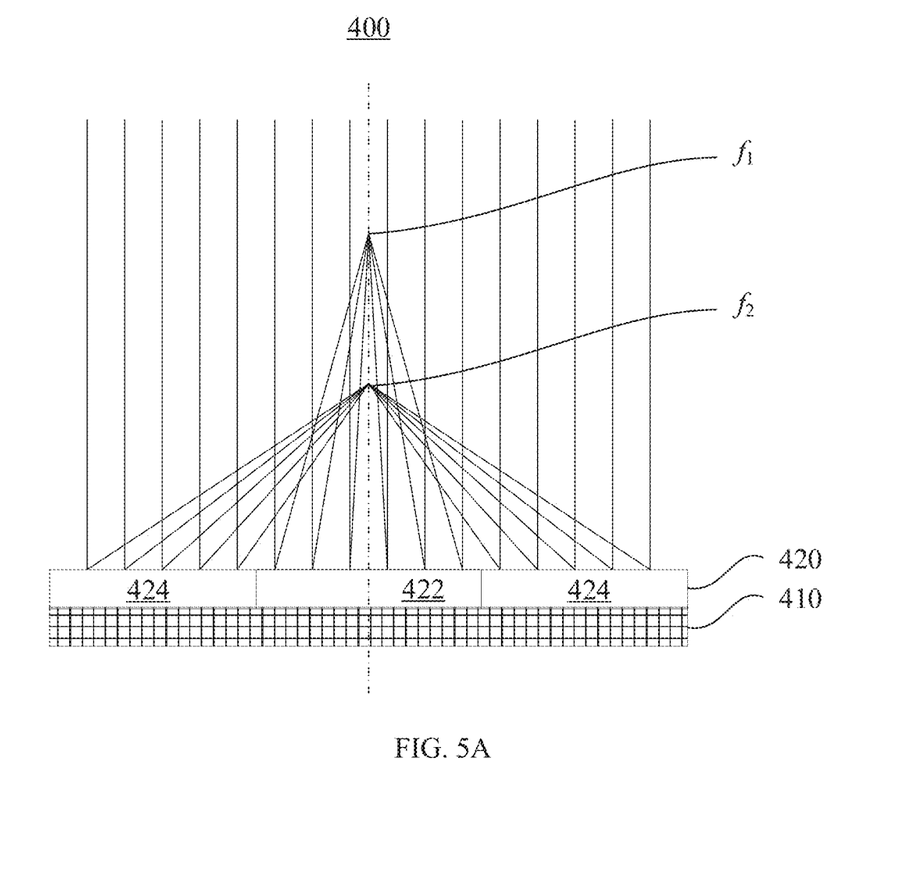
FIGS. 5A-5D show different example configurations of a PVH layer of the PVH lens shown in FIGS. 4A and 4B.

In some embodiments, as shown in FIG. 5A, the first region 422 and the second region 424 have different optical powers while the optical axes of the first region 422 and the second region 424 almost coincide with each other. In the example shown in FIG. 5A, a focal length or effective focal length of the first region 422 is longer than a focal length or effective focal length of the second region 424, i.e., the focal point $f_1$ of the first region 422 is farther away from the optical center of the PVH layer 420 than the focal point $f_2$ of the second region 424. That is, the optical power of the first region 422 is smaller than the optical power of the second region 424. Further, the optical axes of the first region 422 and the second region 424 almost coincide with each other, which are indicated by a dash-dotted line in FIG. 5A.

With the configuration shown in FIG. 5A, the field of view (FOV) of the second region 424 can encompass the FOV of the first region 422. Therefore, the second region 424 can be used to image a larger area than the first region 422 does given a same target object distance. For example, when the PVH lens 400 is used in an HMD for eye tracking, the first region 422 can be used to image an eye of a user and the second region 424 can be used to image an area surrounding the user's eye, such as an area including the eyebrow and/or part of the cheek. In some embodiments, the first region 422 and the second region 424 can be configured such that an image formed by the second region 424 can have a lower resolution than an image formed by the first region 422.

Figure 5B:
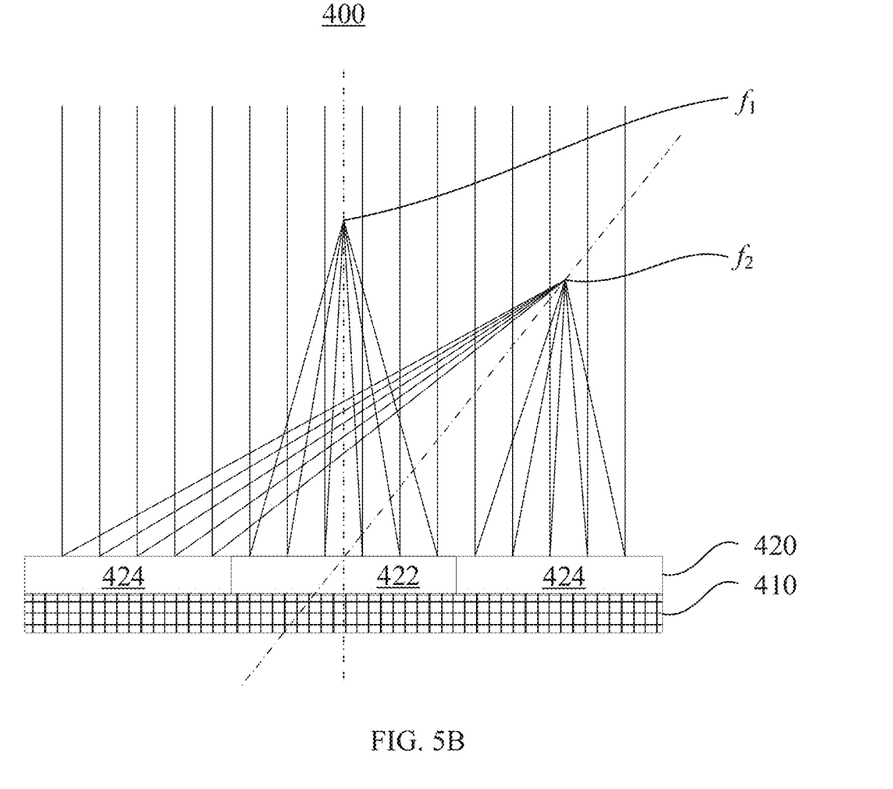

In some embodiments, as shown in FIG. 5B, the optical axis of the first region 422 and the optical axis of the second region 424 point toward different directions, as indicated by the dash-dotted lines in FIG. 5B. Further, in the example shown in FIG. 5B, a focal length or effective focal length of the first region 422 and a focal length or effective focal length of the second region 424 are approximately the same, i.e., the optical power of the first region 422 and the optical power of the second region 424 are approximately the same. In the example shown in FIG. 5B, because the optical axis of the first region 422 and the optical axis of the second region 424 point toward different directions, the first region 422 and the second region 424 can be used to image different areas of a target object. For example, when the PVH lens 400 is used in an HMD for eye tracking, the first region 422 can be used to image an eye of a user and the second region 424 can be used to image an area near the user's eye, such as an area above the user's eye that includes the eyebrow or an area below the user's eye that includes a part of the cheek.

In the embodiments described above in connection with FIG. 5A, the optical powers of the first region 422 and the second region 424 are different from each other while the optical axes of the first region 422 and the second region 424 approximately coincide with each other. On the other hand, in the embodiments described above in connection with FIG. 5B, the optical powers of the first region 422 and the second region 424 are approximately the same as each other while the optical axes of the first region 422 and the second region 424 point to different directions. The first region 422 and the second region 424 can be configured in other suitable manners. For example, the LC molecules in the PVH layer 420 can be configured such that the optical powers of the first region 422 and the second region 424 are different from each other and the optical axes of the first region 422 and the second region 424 point toward different directions.

Figure 5C:
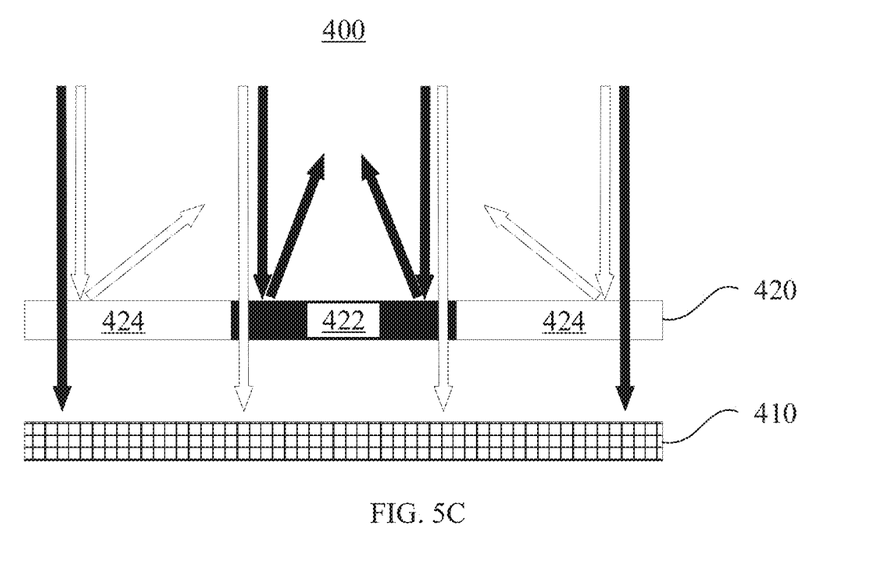

In some embodiments, the first region 422 and the second region 424 of the PVH layer 420 can be configured to respond to incident light with different handednesses. For example, as shown in FIG. 5C, the first region 422 has a left handedness (i.e., the helix twist of the LC molecules in the first region 422 has a left handedness, indicated by solid block in the figure), and hence can reflect incident light having a left-handed circular polarization (indicated by solid arrow in the figure) and transmit incident light having a right-handed circular polarization (indicated by hollow arrow in the figure) without affecting the transmission path thereof. On the other hand, the second region 424 has a right handedness (i.e., the helix twist of the LC molecules in the second region 424 has a right handedness, indicated by hollow block in the figure), and hence can reflect incident light having a right-handed circular polarization and transmit incident light having a left-handed circular polarization without affecting the transmission path thereof. For illustrative purposes, in FIG. 5C, the substrate 410 and the PVH layer 420 are shown as spaced apart from each other. In actual implementation, they can contact each other or be spaced apart from each other by, for example, one or more spacing members, or by being held at different places of a frame or a housing of the PVH lens 400 or an optical system having the PVH lens 400. In some embodiments, additional layer(s), such as protection layer(s) and/or buffer layer(s), can be arranged between the substrate 410 and the PVH layer 420.

In some embodiments, the first region 422 and the second region 424 can respond to incident light having an approximately same wavelength, e.g., a wavelength within the range between about 800 nm and about 1600 nm, such as about 850 nm, about 940 nm, or about 980 nm. In some embodiments, the first region 422 and the second region 424 can respond to incident light having different wavelengths, e.g., wavelength within the range between about 800 nm and about 1600 nm. For example, the first region 422 can respond to one of several wavelengths including, e.g., about 850 nm, about 940 nm, or about 980 nm, and the second region 424 can respond to another one of the several wavelengths. As a specific example, the first region 422 can respond to incident light of about 850 nm and the second region 424 can respond to incident light of about 940 nm.

In the embodiments described above in connection with FIGS. 5A-5C, the optical center of the first region 422 and the optical center of the second region 424 approximately coincide with each other, and the optical axis of the first region 422 and the optical axis of the second region 424 pass through about a same point on the PVH layer 420. In some embodiments, the optical center of the first region 422 and the optical center of the second region 424 may not coincide with each other.

In the embodiments described above in connection with FIGS. 5A-5C, both the first region 422 and the second region 424 are configured as reflective lenses. In some other embodiments, the LC molecules in the PVH layer 420 can be configured such that both the first region 422 and the second region 424 can function as transmissive lenses. In some other embodiments, the LC molecules in the PVH layer 420 can be configured such that one of the first region 422 and the second region 424 can function as a reflective lens and the other one of the first region 422 and the second region 424 can function as a transmissive lens.

Figure 5D:
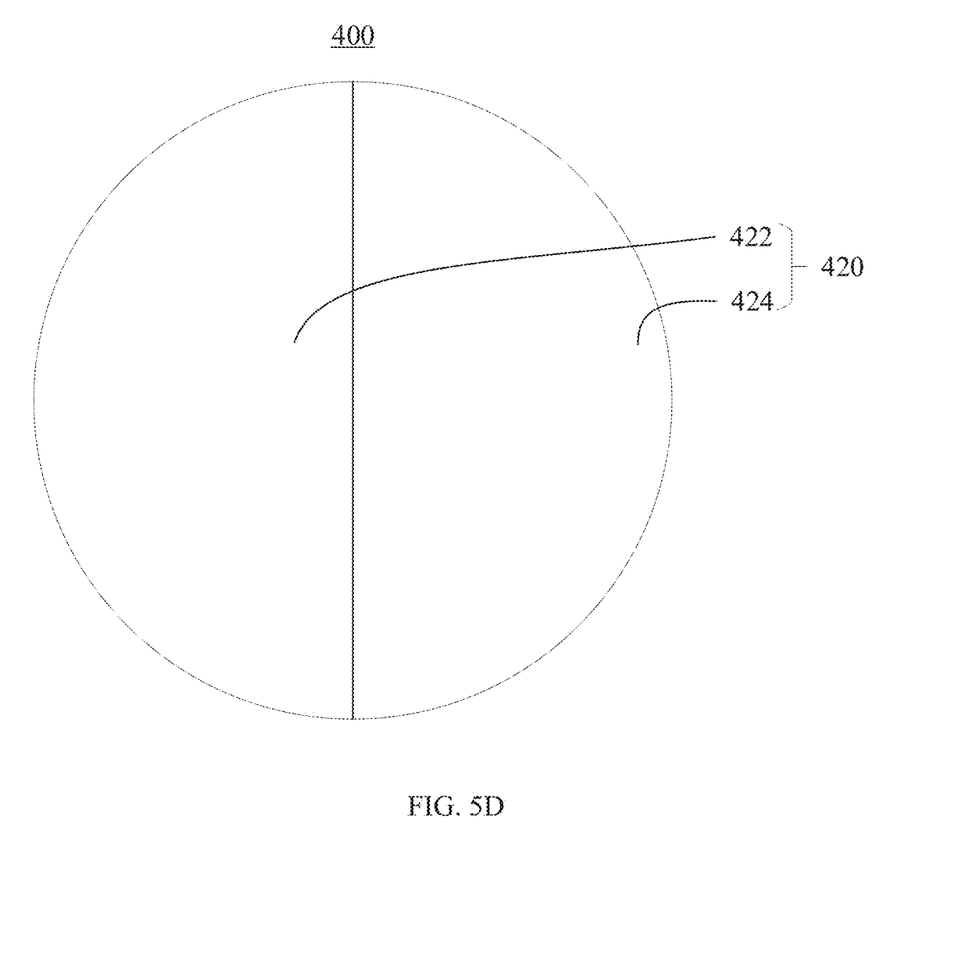

In the embodiments described above in connection with FIGS. 5A-5C, the second region 424 encircles the first region 422. In some other embodiments, the relative spatial relationship between the first region 422 and the second region 424 can be any suitable relationship. For example, as shown in FIG. 5D, the first region 422 and the second region 424 can be arranged side by side. In the embodiments described in connection with FIG. 5D, the optical powers of the first region 422 and the second region 424 may be approximately the same as or different from each other, the optical axes of the first region 422 and the second region 424 may point to approximately the same direction (i.e., approximately parallel to each other) or point to different directions, the first region 422 and the second region 424 may respond to approximately the same light wavelength or different light wavelengths, and the first region 422 and the second region 424 may respond to the same light polarization handedness or different light polarization handednesses.

In the example shown in FIG. 5D, each of the first region 422 and the second region 424 is about a half of the PVH layer 420. In some other embodiments, the first region 422 and the second region 424 can include more or less than a half of the PVH layer 420. For example, the first region 422 can include one third of the PVH layer 420 and the second region 424 can include two thirds of the PVH layer 420.

Figure 6A:
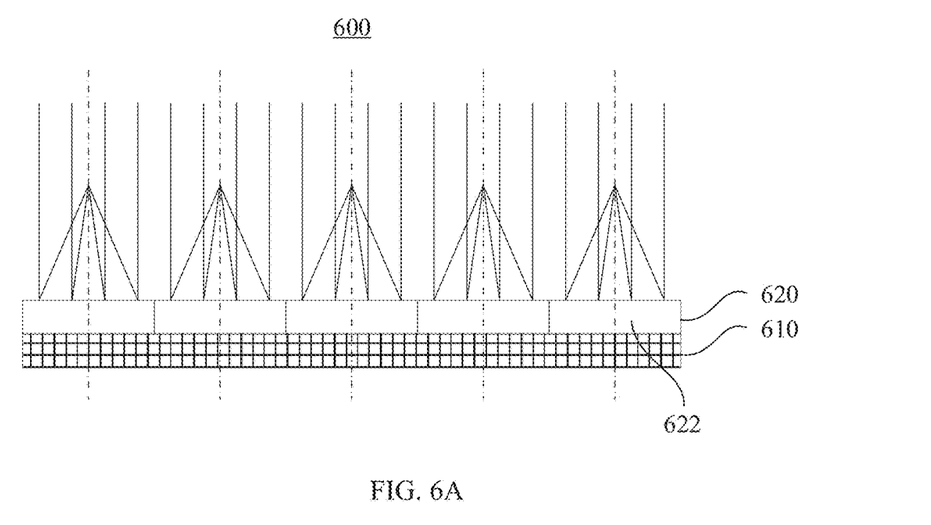
FIGS. 6A and 6B are schematic views of another example PVH lens consistent with the disclosure.
Figure 6B:
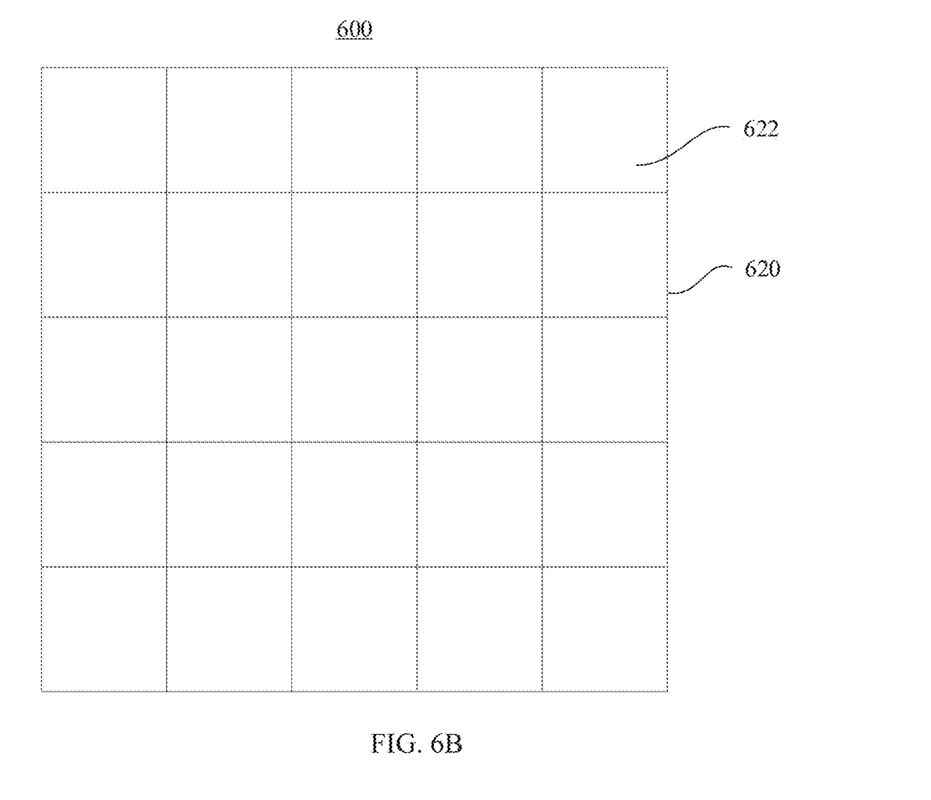

In the embodiments described above in connection with FIGS. 5A-5D, the PVH layer 420 includes two regions having different optical properties. In some other embodiments, the PVH layer 420 can include more than two regions having different optical properties. Each of the more than two regions can individually function as a lens. FIGS. 6A and 6B are schematic views of another example PVH lens 600 consistent with the disclosure. FIG. 6A is a cross-sectional view of the PVH lens 600 and FIG. 6B is a plan view of the PVH lens 600. As shown in FIGS. 6A and 6B, the PVH lens 600 includes a substrate 610 and a PVH layer 620 arranged over the substrate 610. The substrate 610 can be the same as or similar to the substrate 410, and hence detailed description thereof is omitted.

As shown in FIGS. 6A and 6B, the PVH layer 620 has a freeform design and includes a plurality of regions 622 having different optical properties. In the example shown in FIGS. 6A and 6B, the plurality of regions 622 are arranged as an array, and each of the regions 622 can individually function as a lens, such as a reflective lens or a transmissive lens. In some embodiments, the regions 622 can be different from each other in terms of at least one of optical power, optical center, optical axis direction, responded wavelength, responded polarization handedness, or whether reflective or transmissive. For example, as shown in FIGS. 6A and 6B, the regions 622 can be configured to be identical lens arranged in an array and hence each of the regions 622 can individually image an area of a target object.

In the embodiments described above in connection with FIGS. 4A-6B, different regions of the PVH layer 420, 620 that have different optical properties are configured in a sudden-change manner. In some other embodiments, the PVH layer 420, 620 can further include a transition region between two neighboring regions (also referred to as "functional regions") having different optical properties. The transition region can have an optical property that varies gradually from the optical property of one of the neighboring functional region to the optical property of another one of the neighboring functional region. For example, if the two neighboring functional regions have different optical powers, the transition region can have a varying optical power changing from an optical power approximately same as that of one of the two neighboring functional regions to an optical power approximately same as that of the other one of the two neighboring functional regions.

Figure 7:
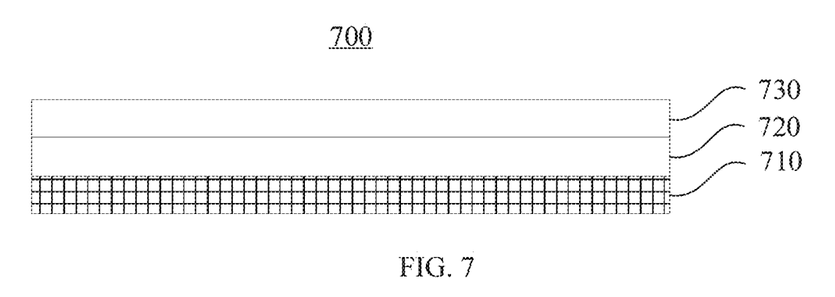
FIG. 7 schematically shows another example PVH lens consistent with the disclosure.

In the embodiments described above in connection with FIGS. 4A-6B, the PVH lens includes one PVH layer. In some other embodiments, the PVH lens can include two or more PVH layers. FIG. 7 schematically shows another example PVH lens 700 consistent with the disclosure. As shown in FIG. 7, the PVH lens 700 includes a substrate 710, a first PVH layer 720 arranged over the substrate 710, and a second PVH layer 730 arranged over the first PVH layer 720. The substrate 710 can be the same as or similar to the substrate 410 described above, and hence detailed description thereof is omitted. For illustrative purposes, in FIG. 7, neighboring ones of the substrate 710, the first PVH layer 720, and the second PVH layer 730 are shown as contacting each other. In actual implementation, they can contact each other or be spaced apart from each other by, for example one or more spacing members, or by being held at different places of a frame or a housing of the PVH lens 700 or an optical system having the PVH lens 700. In some embodiments, additional layer(s), such as protection layer(s) and/or buffer layer(s), may be arranged between each neighboring pair of the substrate 710, the first PVH layer 720, and the second PVH layer 730.

Either or both of the first PVH layer 720 and the second PVH layer 730 can include a freeform PVH layer consistent with the disclosure, such as one of the example freeform PVH layers described above in connection with FIGS. 4A-6B. In some embodiments, the first PVH layer 720 includes a freeform PVH layer consistent with the disclosure, while the second PVH layer 730 includes a non-freeform PVH layer. In some embodiments, the first PVH layer 720 includes a non-freeform PVH layer, while the second PVH layer 730 includes a freeform PVH layer consistent with the disclosure. In some embodiments, each of the first PVH layer 720 and the second PVH layer 730 includes a freeform PVH layer consistent with the disclosure. In some embodiments, one or both of the first PVH layer 720 and the second PVH layer 730 can be configured to reflect or transmit IR light, e.g., having a wavelength in the range from about 800 nm to about 1600 nm, such as IR light having a wavelength of about 850 nm, about 940 nm, or about 980 nm.

In some embodiments, the first PVH layer 720 and the second PVH layer 730 can have the same or similar configuration. For example, the LC molecules in the first PVH layer 720 and the LC molecules in the second PVH layer 730 can be configured such that a handedness of a helix twist of the first PVH layer 720 and a handedness of a helix twist of the second PVH layer are the same as each other, e.g., the first PVH layer 720 and the second PVH layer 730 can reflect light of the same polarization. As another example, the first PVH layer 720 and the second PVH layer 730 can have a same or similar optical power and/or a same or similar layout.

In some embodiments, the first PVH layer 720 and the second PVH layer 730 can have different configurations. For example, the LC molecules in the first PVH layer 720 and the LC molecules in the second PVH layer 730 can be configured such that a handedness of a helix twist of the first PVH layer 720 and a handedness of a helix twist of the second PVH layer are orthogonal to each other, e.g., the first PVH layer 720 and the second PVH layer 730 can reflect light of different polarizations that are orthogonal to each other and hence the entire or most part of the incident light can be reflected. As another example, the first PVH layer 720 and the second PVH layer 730 can have different optical powers and/or different layouts.

In the embodiments that both first PVH layer 720 and the second PVH layer 730 both have a freeform design, the first PVH layer 720 and the second PVH layer 730 can have an approximately same configuration. That is, the first PVH layer 720 and the second PVH layer 730 can be considered as approximately same copy as each other.

Figure 8:
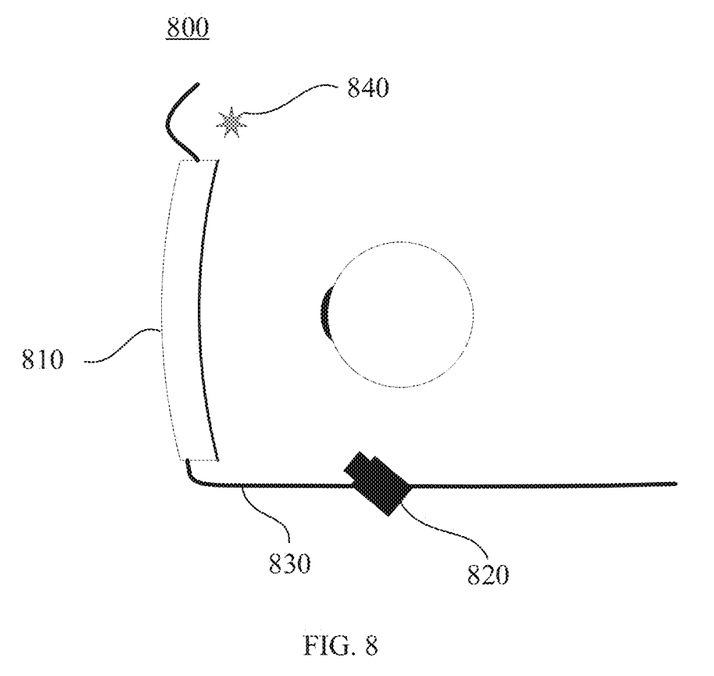
FIG. 8 is a schematic view of an example optical system consistent with the disclosure.

A PVH lens consistent with the disclosure can be used in any optical system in which a lens, such as a reflective lens or a transmissive lens, is needed. FIG. 8 is a schematic view of an example optical system 800 consistent with the disclosure. In FIG. 8, the optical system 800 is shown as an HMD, such as smart glasses. FIG. 8 shows a portion of the optical system 800, where the un-shown portion of the optical system 800 can be symmetric to the illustrated portion of the optical system 800.

The optical system 800 includes a PVH lens 810 configured to reflect light, such as circularly polarized IR light, from a target object, and an optical sensor 820 configured to generate an image using the light reflected by the PVH lens 810. The PVH lens 810 can be a PVH lens consistent with the disclosure, such as one of the example PVH lenses described above in connection with FIGS. 4A-7, which includes at least one freeform PVH layer. The optical sensor 820 can be any suitable optical sensor. In some embodiments, the optical sensor 820 can be sensible to light having a wavelength within a spectrum that includes IR spectrum. In some embodiments, the optical sensor 240 can be sensible to IR light but not visible light. The optical sensor 820 can be a camera and can include, for example, a charge-coupled device (CCD) sensor, a complementary metal-oxide-semiconductor (CMOS) sensor, or an N-type metal-oxide-semiconductor (NMOS) sensor.

The optical sensor 820 can be mounted at any suitable part of the optical system 800, so long as the optical sensor 820 can be arranged to face the PVH lens 810 to receive light reflected by the PVH lens 810. In some embodiments, the optical system 800 can include a frame or a housing, and the optical sensor 820 can be mounted on the frame or the housing. As shown in FIG. 8, the optical system 800 further includes a mounting member 830 for mounting the optical system 800 to an object, such as a user's head. The optical sensor 820 can be mounted at the mounting member 830. In some embodiments, the optical system 800 can include smart glasses and the mounting member 830 can include one or more temple arms. The optical sensor 820 can be mounted at one of the one or more temple arms and faces the PVH lens 810.

In some embodiments, the optical system 800 can generate images by utilizing IR light emitted or reflected by the target being tracked, such as the user's eye. In some embodiments, as shown in FIG. 8, the optical system 800 further includes a light source 840 configured to emit a light beam to be reflected by the target toward the PVH lens 810. The light beam emitted by the light source 840 can include a narrow spectrum or a relatively broad spectrum, and one or more wavelengths of the light beam are in the IR spectrum, i.e., the spectrum of the light source 840 can be within, overlap, or encompass the IR spectrum. In some embodiments, at least one wavelength in the spectrum of the light source 840 corresponds to the Bragg period of the Bragg grating formed by the LC molecules in the PVH layer of the PVH lens 810. In some embodiments, the light beam emitted by the light source 840 has a wavelength in the IR spectrum and corresponding to the Bragg period of the Bragg grating in the PVH layer of the PVH lens 810. For example, the wavelength of the light beam can be between about 800 nm and about 1600 nm. In some embodiments, the light beam can have a band of wavelengths centered at, for example, about 850 nm, about 940 nm, or about 980 nm. In some embodiments, the light source 840 can emit light of a plurality of wavelengths. For example, the light source 840 can emit light having two or more peak wavelengths, each being, for example, about 850 nm, about 940 nm, or about 980 nm.

Figure 9A:
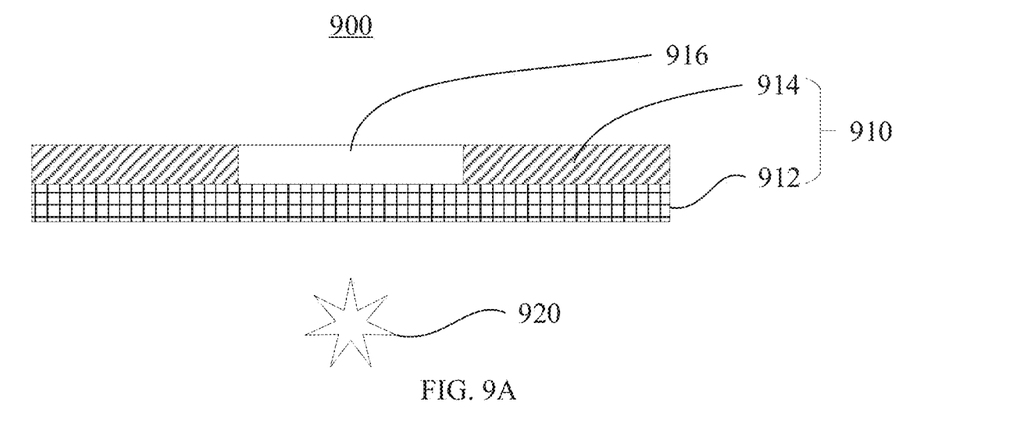
FIGS. 9A and 9B are schematic views of another example optical system consistent with the disclosure.
Figure 9B:
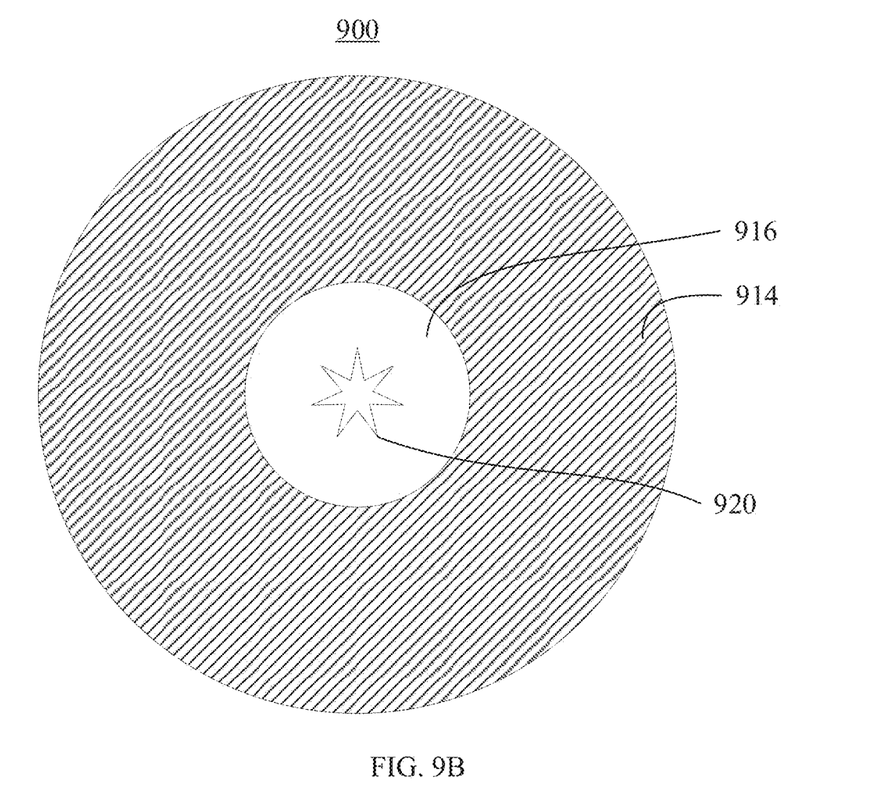

FIGS. 9A and 9B are schematic views of another example optical system 900 consistent with the disclosure. FIG. 9A is a cross-sectional view of the optical system 900 and FIG. 9B is a plan view of the optical system 900. As shown in FIG. 9A, the optical system 900 includes a PVH lens 910 and a light source 920. The PVH lens 910 includes a substrate 912 and a PVH layer 914 arranged over the substrate 912. The substrate 912 provides support to the PVH layer 914, and can be, for example, a piece of rigid material, such as glass or sapphire, a piece of flexible material, such as plastic, or a functional device, such as a display screen. In the example shown in FIGS. 9A and 9B, the substrate 912 can be transparent with respect to at least the light emitted by the light source 920. For example, the light source 920 can emit light in the visible band (about 380 nm to about 750 nm), and hence the substrate 912 can be substantially transparent in at least part or all of the visible band. As another example, the light source 920 can emit light in the IR band (about 750 nm to about 1 mm), and hence the substrate 912 can be substantially transparent in at least part or all of the IR band.

The PVH layer 914 can be any suitable PVH layer consistent with the disclosure. For example, the PVH layer 914 can include a single PVH layer as described above in connection with FIGS. 4A-6B, or can include a composite PVH layer having at least two single PVH layers as described above in connection with FIG. 7.

As shown in FIGS. 9A and 9B, an aperture 916 is formed in the PVH layer 914. The aperture 916 can be formed at a position corresponding to the light source 920 and hence allow the light emitted from the light source 920 to pass through. For example, the aperture 916 can be formed at the middle of the PVH layer 914, or can be formed at any other suitable locations in the PVH layer 914. In some embodiments, two or more apertures 916 can be formed in the PVH layer 914.

The aperture 916 can be a through hole formed in the PVH layer 914, or can include a material that can allow the light emitted from the light source 920 to at least partially pass through. The aperture 916 can have a uniform configuration or a mesh configuration.

In some embodiments, the substrate 912 may also include a substrate aperture arranged at a location corresponding to the aperture 916. The substrate aperture can be a through hole formed in the substrate 912, or can include a material that can allow the light emitted from the light source 920 to at least partially pass through. The substrate aperture can have a uniform configuration or a mesh configuration. In some embodiments, portions of the substrate 912 other than the substrate aperture can include an opaque material that does not allow the light emitted from the light source 920 to pass through.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A polarization volume hologram (PVH) lens comprising:
    a PVH layer configured to reflect an incident light via Bragg diffraction, including a first region and a second region encircling the first region,
    wherein the first region is configured to reflect the incident light when the incident light has a first handedness, and transmit the incident light therethrough when the incident light has a second handedness orthogonal to the first handedness, and
    wherein the second region is configured to reflect the incident light when the incident light has the second handedness, and transmit the incident light therethrough when the incident light has the first handedness.

2. The PVH lens of claim 1, wherein the first region and the second region have different optical powers.

3. The PVH lens of claim 1, wherein a first optical axis of the first region and a second optical axis of the second region extend in different directions and form non-zero angles with respect to a surface of the PVH lens.

4. The PVH lens of claim 1, wherein a second field of view (FOV) of the second region encompasses a first FOV of the first region.

5. The PVH lens of claim 4, wherein a second image formed by the second region has a lower resolution than a first image formed by the first region.

6. The PVH lens of claim 1, wherein the first region and the second region are configured to respond to incident lights of different wavelengths.

7. The PVH lens of claim 6, wherein the first region is configured to respond to the incident light when the incident light has a wavelength of about 850 nm, and the second region is configured to respond to the incident light when the incident light has a wavelength of about 940 nm.

8. The PVH lens of claim 1, wherein the first region is configured to reflect a left-handed circularly polarized light and the second region is configured to reflect a right-handed circularly polarized light.

9. The PVH lens of claim 1, further comprising:
a transition region between the first region and the second region, the transition region having an optical power that varies gradually from the first region to the second region.

10. An optical system comprising:
a polarization volume hologram (PVH) lens including:
a PVH layer configured to reflect an incident light via Bragg diffraction, the PVH layer including a first region and a second region encircling the first region,
wherein the first region is configured to reflect the incident light when the incident light has a first handedness, and transmit the incident light therethrough when the incident light has a second handedness orthogonal to the first handedness, and
wherein the second region is configured to reflect the incident light when the incident light has the second handedness, and transmit the incident light therethrough when the incident light has the first handedness; and
an optical sensor configured to generate an image based on the incident light reflected by the PVH layer.

11. The optical system of claim 10, wherein:
the PVH layer is a first PVH layer; and
the PVH lens further includes a second PVH layer coupled to the first PVH layer,
wherein the second PVH layer includes a third region and a fourth region encircling the third region,
wherein the third region is configured to reflect the incident light when the incident light has the first handedness, and transmit the incident light therethrough when the incident light has the second handedness, and
wherein the fourth region is configured to reflect the incident light when the incident light has the second handedness, and transmit the incident light therethrough when the incident light has the first handedness.

12. The optical system of claim 10, further comprising:
a substrate, the PVH layer being formed over the substrate; and
a temple arm connected to the substrate;
wherein the optical sensor is mounted on the temple arm and faces the PVH lens.

13. The optical system of claim 10, wherein the PVH layer is configured to reflect an infrared (IR) light reflected from an eye.

14. The optical system of claim 13, further comprising:
a light source configured to emit a light beam having a wavelength in IR spectrum.

15. The optical system of claim 10, wherein:
the PVH layer is a first PVH layer, and
the PVH lens further includes a second PVH layer coupled to the first PVH layer,
wherein the second PVH layer includes a third region and a fourth region encircling the third region,
wherein the third region is configured to reflect the incident light when the incident light has the second handedness, and transmit the incident light therethrough when the incident light has the first handedness, and
wherein the fourth region is configured to reflect the incident light when the incident light has the first handedness, and transmit the incident light therethrough when the incident light has the second handedness.

* * * * *